United States Patent
Takada et al.

(10) Patent No.: US 6,766,828 B2
(45) Date of Patent: Jul. 27, 2004

(54) INTERLOCK VALVE

(75) Inventors: Hideyuki Takada, Tsukuba-gun (JP); Bunya Hayashi, Tsukuba-gun (JP); Yukihiro Matarai, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/385,850

(22) Filed: Mar. 12, 2003

(65) Prior Publication Data

US 2003/0201019 A1 Oct. 30, 2003

(30) Foreign Application Priority Data

Apr. 30, 2002 (JP) ........................................ 2002-129031

(51) Int. Cl.$^7$ ............................................. F15B 13/042
(52) U.S. Cl. ....................... 137/625.6; 137/557; 251/26
(58) Field of Search ............................. 137/557, 625.6; 251/26

(56) References Cited

U.S. PATENT DOCUMENTS 5,860,445 A * 1/1999 Yoshimura et al. ........... 251/26
5,868,157 A * 2/1999 Yoshimura et al. ........... 251/26
6,109,291 A * 8/2000 Yoshimura .................... 251/26
6,167,901 B1 * 1/2001 Yoshinura ..................... 251/26

FOREIGN PATENT DOCUMENTS

JP    10-181800    7/1998

* cited by examiner

Primary Examiner—Gerald A. Michalsky
(74) Attorney, Agent, or Firm—Oblon, Spivak, McClelland, Maier & Neustadt, P.C.

(57) ABSTRACT

An interlock valve is formed by incorporating a main valve portion having a valve member into a first casing, incorporating a driving-side operating portion 2 having a driving piston for driving the valve member into a first end plate, incorporating a return-side operating portion having a return spring for returning the valve member into a second end plate, incorporating an OR circuit portion formed to output control fluid to the driving piston by a plurality of shuttle valves, a plurality of OR input ports, and one OR output port into a second casing, and sandwiching the first casing and the second casing between the first end plate and the second end plate positioned to face each other to couple the end plates and the casings.

13 Claims, 4 Drawing Sheets

INTERLOCK VALVE

TECHNICAL FIELD

The present invention relates to an interlock valve which operates when a fluid pressure signal is input to any one of a plurality of input ports to select a flow path for working fluid.

PRIOR ART

For example, an interlock valve device is used for controlling pressure fluid such as compressed air and pressure oil supplied to a fluid pressure apparatus or for controlling fluid such as gas and liquid supplied to chemical machines and instruments for reactions, measurements, and the like. The valve device is normally formed of one pilot-type selector valve and an OR circuit which is a combination of a plurality of shuttle valves. If a fluid pressure signal is input to any one of a plurality of input ports communicating with the OR circuit, pilot fluid is output from the OR circuit to the selector valve and the selector valve operates to select a flow path for working fluid.

In such a valve device, the selector valve and the plurality of shuttle valves are normally mounted onto a manifold. In this case, if the selector valve and the shuttle valves are formed individually, they are badly organized as a whole and difficult to handle, it requires much trouble to mount them onto the manifold, and maintainability is poor. Incorporating the selector valve and the plurality of shuttle valves into a single common body makes them well organized but tends to result in inconvenience on the contrary in individually checking operations of the selector valve and the OR circuit or in individually exchanging or maintaining them.

DISCLOSURE OF THE INVENTION

It is a technical object of the present invention to incorporate a selector valve for switching working fluid and an OR circuit portion which is a combination of a plurality of shuttle valves into individual casings so as to form the selector valve and the OR circuit portion in forms independent of each other, thereby enhancing ease of handling of them and allowing individual operation checks and exchanges to enhance maintainability.

To achieve the above object, according to the invention, there is provided an interlock valve comprising: a main valve portion including a plurality of valve ports, a valve hole with which the valve ports communicate, a main valve portion having a valve member housed to be displaced in the valve hole to select a flow path; a driving-side operating portion having a driving piston disposed on a side of one end of the valve member to operate by an action of fluid pressure to switch the valve member and a driving pressure chamber for causing the fluid pressure to act on the driving piston; a return-side operating portion having a return spring disposed on a side of the other end of the valve member; and an OR circuit portion formed of a plurality of shuttle valves, a plurality of OR input ports, and one OR output port such that fluid pressure input to any one of the OR input ports is output from the OR output port to the driving pressure chamber, wherein the main valve portion is provided in a first casing, the OR circuit portion is provided in a second casing, the driving-side operating portion is provided in a first end plate, the return-side operating portion is provided in a second end plate, the first casing and the second casing arranged side by side are sandwiched between the first end plate and the second end plate disposed to face each other, and a flow path connecting the OR output port and the driving pressure chamber is provided in the first end plate.

In the interlock valve having the above structure, if fluid pressure is input to one of the OR input ports, the fluid pressure is output from the OR output port to the driving pressure chamber and pushes the driving piston to move the valve member. Therefore, the flow path for the working fluid is selected. At this time, the return spring is compressed and energy is stored. If input of the fluid pressure from the OR input port ceases, the valve member and the driving piston are returned to a home position by a biasing force of the return spring to select an original flow path.

Because the main valve portion and the OR circuit portion are incorporated into individual casings to be formed in forms independent of each other and the casings arranged side by side are sandwiched between the first end plate and the second end plate having the driving side operating portion and the return side operating portion, the whole valve can be formed in a systematic, compact, and organized form and can be easily handled in assembly. Moreover, because a check of operations and exchange in a case of a failure of the main valve portion and the OR circuit portion can be carried out individually, maintainability is excellent.

In the invention, it is preferable that the return-side operating portion provided in the second end plate has a return piston for forcibly returning the valve member and a return pressure chamber for causing fluid pressure to act on the return piston, that the return spring acts on the valve member through the return piston, and that a return port is provided to the second casing and connected to the return pressure chamber.

As a result, by supplying the fluid pressure from the return port to the return pressure chamber in an emergency, the valve member can be returned forcibly by the return piston and the biasing force of the return spring.

According to another preferable structural form of the invention, the first end plate has an operation indicator to be brought into an indicating state by an action of fluid pressure and the operation indicator is connected to the OR output port and the driving pressure chamber.

The operation indicator has a transparent cover provided to the first end plate to project outside and an indicating element colored with a prominent color, disposed for forward and rearward movements inside the transparent cover, and biased elastically and rearward by a spring, a piston portion is provided to a lower end portion of the indicating element and is housed for sliding in an indicating pressure chamber, and the indicating pressure chamber communicates with the driving pressure chamber.

According to a concrete structural form of the invention, the OR circuit portion has first to third three shuttle valves and first to fourth four OR input ports, two input ports of the first shuttle valve are connected to the first and second OR input ports, two input ports of the second shuttle valve are connected to the third and fourth OR input ports, output ports of the first and second shuttle valves are respectively connected to two input ports of the third shuttle valve, and an output port of the third shuttle valve is connected to the OR output port.

In the valve of the invention, the respective valve ports of the main valve portion open in a lower face of the first casing, the respective OR input ports of the OR circuit portion open in a lower face of the second casing, and the first casing and the second casing are mounted onto a common manifold such that fluid pressure is supplied to and discharged from the respective ports through the manifold.

BRIEF DESCRIPTION OF THE INVENTION

DETAILED DESCRIPTION

Figure 1:
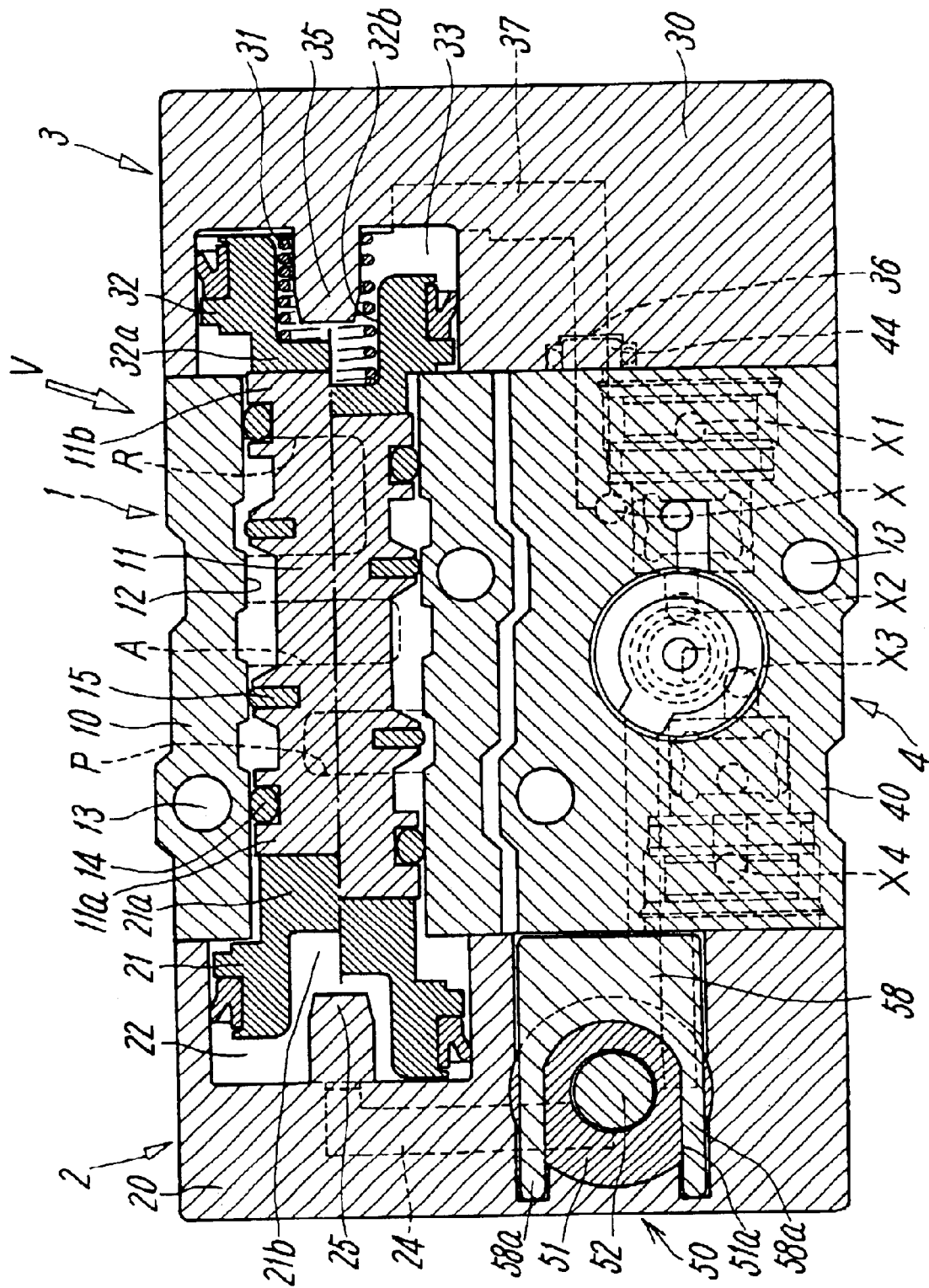
FIG. 1 is a cross-sectional view of a first embodiment of an interlock valve according to the present invention and is a cutaway view taken along a line I—I in FIG. 2.
Figure 2:
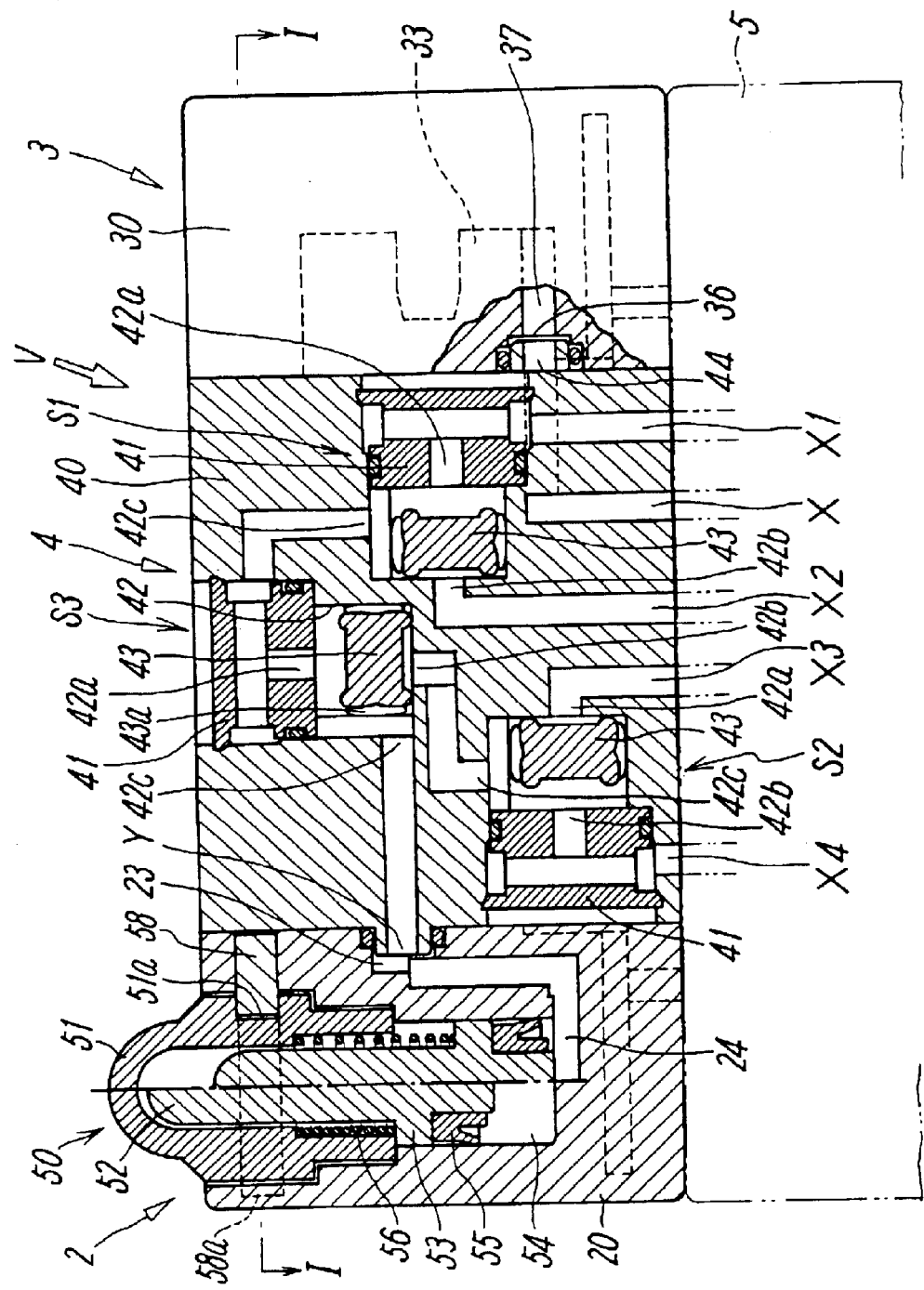
FIG. 2 is a vertical sectional view of the valve in FIG. 1 and is a cutaway view taken in positions of an OR circuit portion and an air indicating portion.
Figure 3:
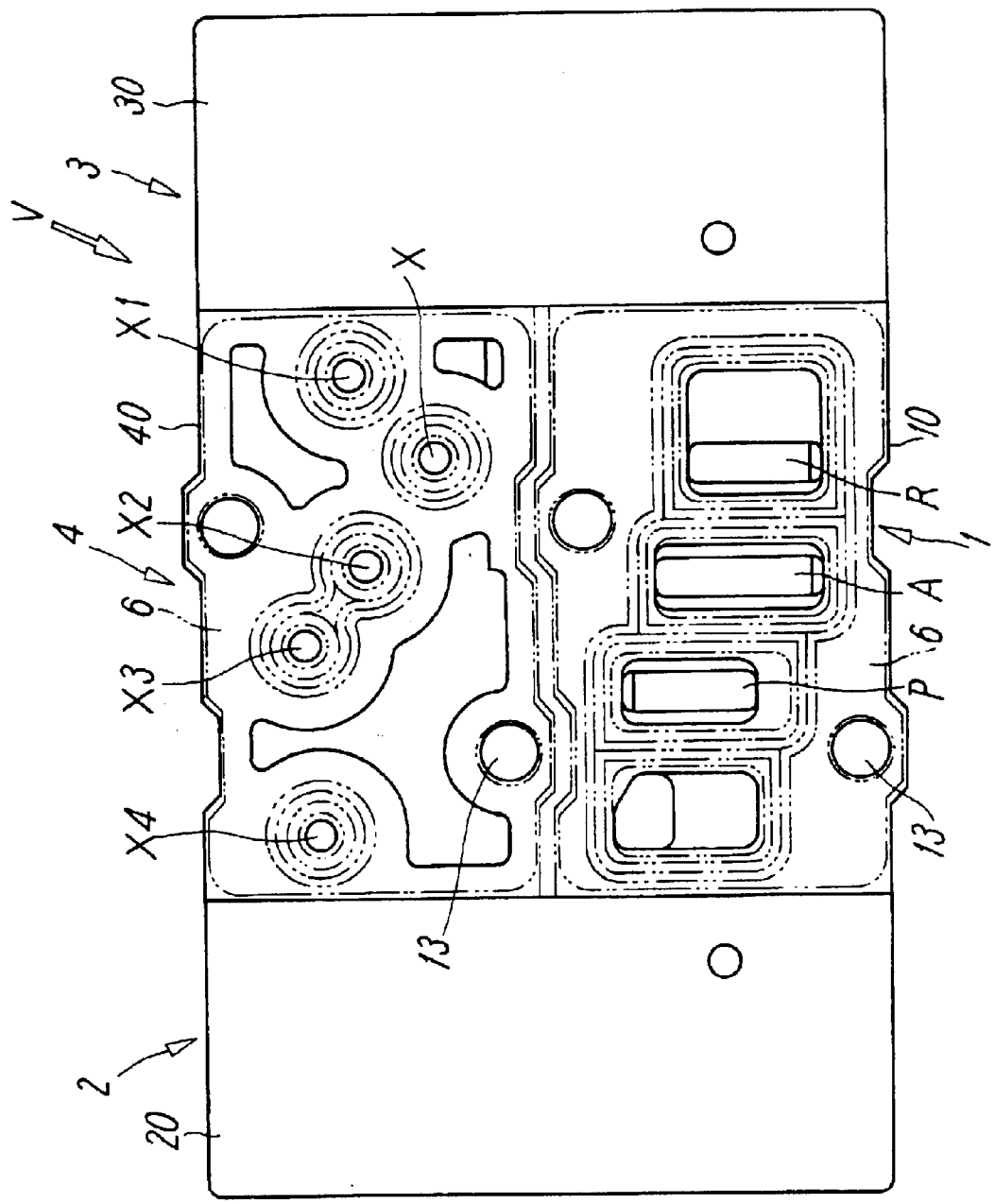
FIG. 3 is a bottom view of the valve in FIG. 1.

FIGS. 1 to 3 show a representative embodiment of an interlock valve V according to the present invention. The valve includes a main valve portion 1 for selecting a flow path for working fluid such as compressed air, pressure oil, and source gas with an internal valve member 11, a driving-side operating portion 2 for driving the valve member 11 with a driving piston 21, a return-side operating portion 3 for returning the valve member 11 with a return spring 31 and a return piston 32, and an OR circuit portion 4 for supplying control fluid such as compressed air to the driving piston 21 and the return piston 32.

The main valve portion 1 is incorporated into a first casing 10, the OR circuit portion 4 is incorporated into a second casing 40, and the driving-side operating portion 2 is incorporated into a first end plate 20, and the return-side operating portion 3 is incorporated into a second end plate 30. Between the first end plate 20 and the second end plate 30 disposed to face each other, both the casings 10 and 40 arranged side by side are sandwiched. The casings 10 and 40 are fixed to each other and the end plates 20 and 30 are fixed to each other respectively by screws. As a result, the casings 10 and 40 and the end plates 20 and 30 are coupled integrally. In this state, they are mounted onto a common manifold 5 through a gasket 6.

The first casing 10 and the second casing 40 have substantially similar outside shapes and outside diameters to each other and the first end plate 20 and the second end plate 30 have substantially similar outside shapes and outside diameters to each other and heights of them are substantially the same. Therefore, if the casings 10 and 40 and the end plates 20 and 30 are coupled integrally as described above, a substantially rectangular block shape is obtained as a whole.

The main valve portion 1 has a structure as a three-port selector valve and includes the first casing 10 formed of a member in a shape of a rectangular parallelepiped having a rectangular section which is slightly long in a vertical direction, three valve ports opening in a bottom face of the first casing 10, i.e., a supply port P, an output port A, and a discharge port R, a valve hole 12 formed inside the first casing 10 and with which the valve ports P, A, and R communicate, and the spool-type valve member 11 housed for sliding in an axial direction in the valve hole 12. The main valve portion 1 selects the flow path between the ports P, A, and R by displacement of the valve member 11.

In an example shown in the drawings, the main valve portion 1 is of a normally open type. When the valve member 11 returns to its home position as shown in a lower half portion in FIG. 1, the supply port P and the output port A communicate and the discharge port R is closed. When the valve member 11 is in an operating position as shown in an upper half portion in FIG. 1, the output port A and the discharge port R communicate and the supply port P is closed.

In the drawings, a reference numeral 13 designates a screw insertion hole through which a screw for fixing the first casing 10 to the manifold 5 is inserted and reference numerals 14 and 15 designate sealing members mounted to the valve member 11.

The driving-side operating portion 2 includes the driving piston 21 disposed on a side of a first end 11a of the valve member 11 and a driving pressure chamber 22 formed on a side of a pressure-receiving face of the driving piston 21. The driving piston 21 and the driving pressure chamber 22 are incorporated into the first end plate 20. A tip end of a rod 21a of the driving piston 21 is in contact with an end face of the valve member 11. When the control fluid is supplied to the driving pressure chamber 22 from the OR circuit portion 4, the driving piston 21 moves forward to switch the valve member 11 to the operating position shown in the upper half portion in FIG. 1.

The first end plate 20 is a member in a shape of a rectangular parallelepiped having a rectangular section which is slightly long in a vertical direction. The first end plate 20 has such a length as to be astride both the first casing 10 and the second casing 40. The first end plate 20 is provided with a connecting hole 23 connected to an OR output port Y of the OR circuit portion 4 at a position of an inner face of the first end plate 20 in contact with the second casing 40. A driving flow path 24 connecting the connecting hole 23 and the driving pressure chamber 22 is provided in the plate and the control fluid is supplied from the OR circuit portion 4 to the driving pressure chamber 22 through the driving flow path 24.

The first end plate 20 is also provided with an operation indicator 50 which is brought into an indicating state by an action of fluid pressure. The operation indicator 50 is actuated when the control fluid is supplied to the driving pressure chamber 22, indicates that the interlock valve V is in an operating state, and includes a cylindrical transparent cover 51 provided to project on the first end plate 20 and a rod-shaped indicating element 52 disposed to be movable in a vertical direction in the cover 51. The indicating element 52 is colored with a prominent color such as red and orange and has a piston portion 53 at a lower end portion of the element 52. The piston portion 53 is housed for sliding in an indicating pressure chamber 54 through a sealing member 55 and is constantly biased rearward by a spring 56. The indicating pressure chamber 54 is connected to the driving flow path 24. When the control fluid is supplied to the indicating pressure chamber 54, the indicating element 52 moves up while compressing the spring 56 as shown in a left half portion in FIG. 2 to be visually recognized from outside through the cover 51. When the fluid in the driving pressure chamber 22 and the indicating pressure chamber 54 is discharged, the indicating element 52 moves down by a biasing force of the spring 56 as shown in a right half portion in FIG. 2 and the indicating state is cancelled.

In the drawings, a reference numeral 58 designates a retaining member for retaining the cover 51 in a mounted state. The retaining member 58 has a pair of locking arms 58a and 58a extending in parallel and engaged with a locking groove 51a on an outer periphery of the cover 51. The retaining member 58 can be mounted to and detached from the first end plate 20 and the cover 51 can be detached by detaching the retaining member 58.

The return-side operating portion 3 includes the return piston 32 disposed on a side of a second end 11b of the valve member 11, a return pressure chamber 33 formed on a side of a pressure receiving face of the return piston 32, the return spring 31 disposed in the return pressure chamber 33, and the second end plate 30 into which the return piston 32, the return pressure chamber 33, and the return spring 31 are incorporated. The return piston 32 is in contact with an end face of the valve member 11 through a rod 32a and the return spring 31 is disposed between the return piston 32 and the second end plate 30 to bias the valve member 11 in a returning direction through the return piston 32. Because the return piston 32 and the driving piston 21 are formed to be of substantially the same size as each other, pressure-receiving areas of them are substantially equal to each other.

In the drawing, a reference numeral 35 designates a shaft portion projecting from a chamber wall of the return pressure chamber 33 and fitted in a recessed portion 32b of the return piston 32. The shaft portion 35 functions as a spring guide. Although the driving pressure chamber 22 on a side of the first end plate 20 is also provided with a similar shaft portion 25 fitted in a recessed portion 21b of the driving piston 21, the shaft portions 25 and 35 and the recessed portions 21b and 32b of the pistons are provided so as to provide a common basic structure to the driving side and return side and the driving-side shaft portion and recessed portion may be omitted if they are unnecessary.

The second end plate 30 is formed of a member in a shape of a rectangular parallelepiped having a rectangular section which is slightly long in a vertical direction similarly to the first end plate 20. The second end plate 30 has such a length as to be astride both the first casing 10 and the second casing 40. The second end plate 30 is provided with a connecting hole 36 connected to a return connecting hole 44 provided to the second casing 40 at a position of an inner face of the second end plate 30 in contact with the second casing 40. A return flow path 37 connecting the connecting hole 36 and the return pressure chamber 33 is provided in the plate. The return connecting hole 44 communicates with a return port X provided to the second casing 40.

In the return-side operating portion 3, when the control fluid is not supplied from the return port X to the return pressure chamber 33, only a biasing force of the return spring 31 acts on the valve member 11 through the return piston 32. When the driving piston 21 moves forward and the valve member 11 is moved to a selecting position shown in an upper half portion in FIG. 1 due to supply of the control fluid to the driving pressure chamber 22, the return spring 31 is compressed through the return piston 32. If the fluid in the driving pressure chamber 22 is discharged from this state, the valve member 11 and the driving piston 21 are moved rearward by the biasing force of the return spring 31 through the return piston 32 and return to a home position shown in a lower half portion in FIG. 1.

On the other hand, if the fluid is supplied from the return port X to the return pressure chamber 33 when the control fluid has been supplied to the driving pressure chamber 22 and the valve member 11 has moved to the selecting position shown in the upper half portion in FIG. 1, the valve member 11 and the driving piston 21 are forcibly returned to a selecting position shown in the lower half portion in FIG. 1 by a resultant of the fluid pressure acting force and the biasing force of the return spring 31 acting on the return piston 32. In this case, it is desirable to supply control fluid of pressure equal to or higher than that of the driving pressure chamber 22 to the return pressure chamber 33. As a result, the resultant of the fluid pressure acting force and the biasing force of the return spring 31 acting on the return piston 32 is reliably larger than the fluid pressure acting force acting on the driving piston 21. Therefore, the valve member 11 returns swiftly and smoothly.

The OR circuit portion 4 includes first to third tree shuttle valves S1, S2, and S3, first to fourth four OR input ports X1, X2, X3, and X4, and the one OR output port Y. The shuttle valves S1, S2, and S3, the OR input ports X1, X2, X3, and X4, and the OR output port Y are incorporated into the second casing 40. The second casing 40 is formed of a member in a shape of a rectangular parallelepiped having a rectangular section which is slightly long in a vertical direction similarly to the first casing 10 of the main valve portion 1. The second casing 40 has substantially the same height and length as the first casing 10.

In the second casing 40, the first shuttle valve S1 is disposed at a position close to the second end plate 30, the second shuttle valve S2 is disposed at a position close to the first end plate 20, and the third shuttle valve S3 is disposed at a position close to an upper face of the second casing 40. The OR input ports X1, X2, X3, and X4 and the OR output port Y are open in a bottom face of the second casing 40.

The respective shuttle valves S1, S2, and S3 have substantially the same structures and are each formed by housing a rubber valve element 43 in a valve chamber 42 partitioned by a partition block 41 such that the valve element 43 can be displaced while being guided by a valve holder 43a. In each the valve chamber 42, two input ports 42a and 42b selectively opened and closed by displacement of the valve element 43 and one output port 42c communicating with the open input port are open. The two input ports 42a and 42b of the first shuttle valve S1 respectively communicate with the first and second OR input ports X1 and X2, the two input ports 42a and 42b of the second shuttle valve S2 respectively communicate with the third and fourth OR input ports X3 and X4, the respective output ports 42c and 42c of the first and second shuttle valves S1 and S2 respectively communicate with the two input ports 42a and 42b of the third shuttle valve S3, and the output port 42c of the third shuttle valve S3 communicates with the OR output port Y.

The manifold 5 includes a plurality of openings communicating with the supply port P, the output port A, and the discharge port R of the main valve portion 1 and a plurality of openings communicating with the respective ports X1, X2, X3, and X4 of the OR circuit portion 4 in a portion of an upper face of the manifold 5 onto which the main valve portion 1 and the OR circuit portion 4 are mounted and includes pipe connecting ports communicating with the respective openings in front and rear or left and right side faces of the manifold 5. The manifold 5 supplies fluid from these ports to the main valve portion 1 and the OR circuit portion 4 through the respective openings and discharges or outputs fluid from the main valve portion 1. Because such structures as the manifold are common, they are not shown in the drawings.

Figure 4:
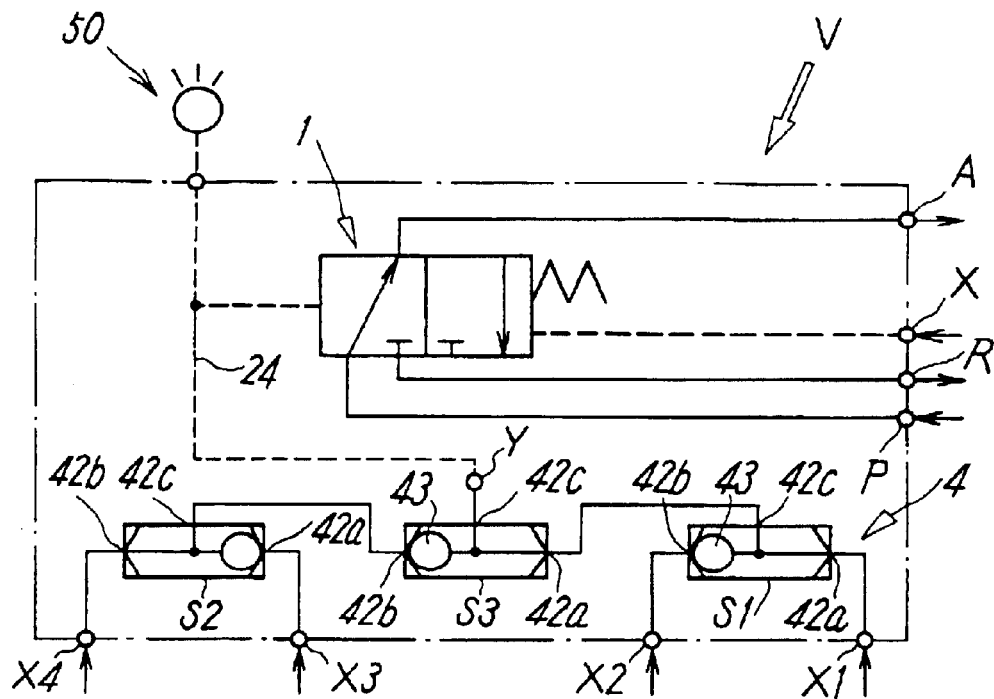
FIG. 4 is a symbolized explanatory view of the valve in FIG. 1.

The interlock valve V having the above structure can be expressed by symbols as shown in FIG. 4. An operation of the valve V is as follows. If the control fluid is supplied to one of the four OR input ports X1, X2, X3, and X4, e.g., the first OR input port X1, because the valve element 43 of the first shuttle valve S1 opens the first input hole 42a and closes the second input port 42b as shown in FIGS. 2 and 4, the fluid is supplied from the output port 42c to the first input port 42a of the third shuttle valve S3. As a result, in the third shuttle valve S3, the valve element 43 opens the first input port 42a and closes the second input port 42b. Therefore, the fluid is output from the output port 42c to the OR output port Y, flows through the driving flow path 24 in the first end plate 20 into the driving pressure chamber 22, and moves the driving piston 21 to displace the valve member 11 of the main valve portion 1 to the selecting position shown in the upper half portion in FIG. 1. At this time, because the control fluid also flows into the indicating pressure chamber 54, the indicating element 52 moves up to enter the indicating state.

If input of the control fluid to the first OR input port X1 ceases, the valve member 11 and the driving piston 21 are moved rearward by the biasing force of the return spring 31 and return to the home position shown in the lower half portion in FIG. 1. At the same time, the indicating element 52 moves rearward to cancel the indicating state.

If the fluid of the same pressure as that of the control fluid supplied to the first OR input port X1 is supplied to the return port X when the fluid is supplied to the first OR input port X1, the return piston 32 operates as already described above. Therefore, the valve member 11 is forcibly returned by a combined action of the return piston 32 and the return spring 31. However, if there is no need to forcibly return the valve member 11 as described above, the above-described return piston 32 and the return pressure chamber 33 can be omitted. In this case, the return port X may be left as it is and used as a breathing port when the valve member 11 moves, but the return port X may also be omitted and a through hole for breathing may be provided to the second end plate.

The above-described interlock valve operates in the same manner when the fluid is input to the other input ports X2, X3, and X4.

Because the valve member 11 and the OR circuit portion 4 are individually incorporated into the first casing 10 and the second casing 40 to be formed in forms independent of each other and the casings 10 and 40 are arranged side by side between the first end plate 20 and the second end plate 30, the whole valve can be formed in a systematic, compact, and organized form and can be easily handled in assembly. Moreover, because a check of operations and exchange in a case of a failure of the valve member 11 and the OR circuit portion 4 can be carried out individually, maintainability is excellent.

Figure 5:
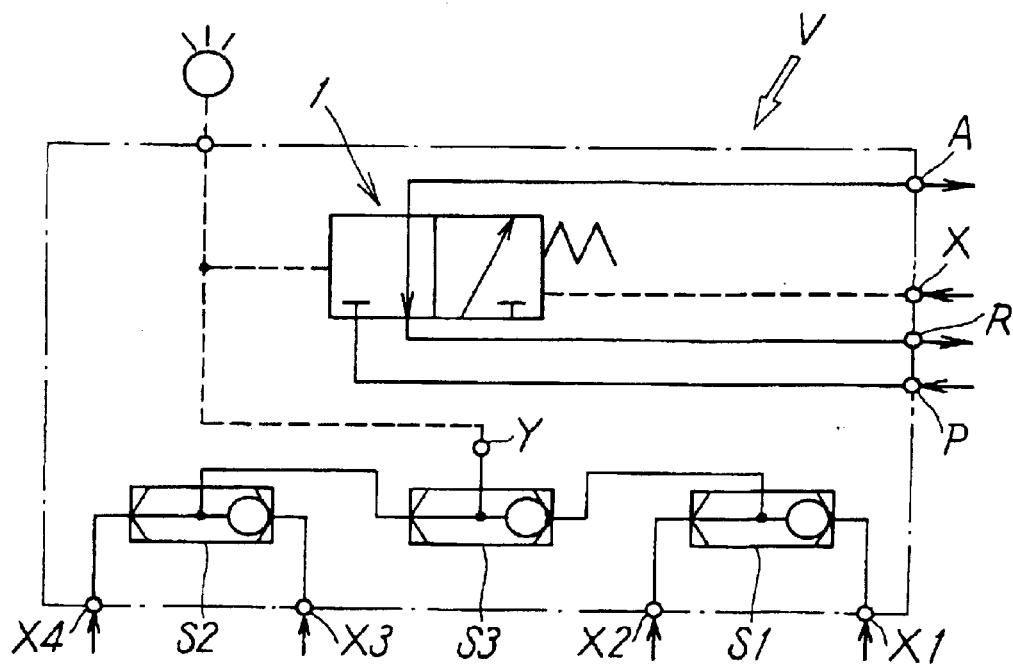
FIG. 5 is a symbolized explanatory view of a second embodiment of the invention.

Although the main valve portion 1 is of the normally open type in the above embodiment, the main valve portion 1 may be of a normally closed type as shown in FIG. 5. In this type, when the valve member 11 has returned to the home position, the output port A and the discharge port R communicate and the supply port P is closed. When the valve member 11 is in the operating position, the supply port P and the output port A communicate and the discharge port R is closed.

The structure of the main valve portion 1 is not limited to the three-port type shown in the drawings and may be of a five-port type or of a type with another number of ports. Furthermore, the number of the shuttle valves forming the OR circuit portion 4 is not limited to three and may be two, four, or more.

As described above, according to the invention, by incorporating the valve member for switching the working fluid and the OR circuit portion formed by combining the plurality of shuttle valves into individual casings, ease of handling of them can be enhanced and the check of operations and exchange can be carried out individually to enhance maintainability.

What is claimed is:

1. An interlock valve comprising: a main valve portion having a plurality of valve ports, a valve hole with which the valve ports communicate, a main valve portion including a valve member housed to be displaced in the valve hole to select a flow path; a driving-side operating portion having a driving piston disposed on a side of a first end of the valve member to operate by an action of fluid pressure to switch the valve member and a driving pressure chamber for causing the fluid pressure to act on the driving piston; a return-side operating portion having a return spring disposed on a side of a second end of the valve member; and an OR circuit portion formed of a plurality of shuttle valves, a plurality of OR input ports, and one OR output port such that fluid pressure input to any one of the OR input ports is output from the OR output port to the driving pressure chamber, wherein the main valve portion is provided in a first casing, the OR circuit portion is provided in a second casing, the driving-side operating portion is provided in a first end plate, the return-side operating portion is provided in a second end plate, the first casing and the second casing arranged side by side are sandwiched between the first end plate and the second end plate disposed to face each other, and a flow path connecting the OR output port and the driving pressure chamber is provided in the first end plate.

2. An interlock valve according to claim 1, wherein the return-side operating portion provided in the second end plate has a return piston for forcibly returning the valve member and a return pressure chamber for causing fluid pressure to act on the return piston, the return spring acts on the valve member through the return piston, and a return port is provided to the second casing and connected to the return pressure chamber.

3. An interlock valve according to claim 2, wherein the first end plate has an operation indicator to be brought into an indicating state by an action of fluid pressure and the operation indicator is connected to the OR output port and the driving pressure chamber.

4. An interlock valve according to claim 3, wherein the operation indicator has a transparent cover provided to the first end plate to project outside and an indicating element colored with a prominent color, disposed for forward and rearward movements inside the transparent cover, and biased elastically and rearward by a spring, a piston portion is provided to a lower end portion of the indicating element and is slidably housed in an indicating pressure chamber, and the indicating pressure chamber communicates with the driving pressure chamber.

5. An interlock valve according to claim 1, wherein the first end plate has an operation indicator to be brought into an indicating state by an action of fluid pressure and the operation indicator is connected to the OR output port and the driving pressure chamber.

6. An interlock valve according to claim 5, wherein the operation indicator has a transparent cover provided to the first end plate to project outside and an indicating element colored with a prominent color, disposed for forward and rearward movements inside the transparent cover, and biased elastically and rearward by a spring, a piston portion is provided to a lower end portion of the indicating element and is slidably housed in an indicating pressure chamber, and the indicating pressure chamber communicates with the driving pressure chamber.

7. An interlock valve according to claim 1, wherein the respective valve ports of the main valve portion open in a lower face of the first casing, the respective OR input ports of the OR circuit portion open in a lower face of the second casing, and the first casing and the second casing are mounted onto a common manifold such that fluid pressure is supplied to and discharged from the respective ports through the manifold.

8. An interlock valve according to claim 1, wherein the OR circuit portion has first to third three shuttle valves and first to fourth four OR input ports, two input ports of the first shuttle valve are individually connected to the first and second OR input ports, two input ports of the second shuttle valve are individually connected to the third and fourth OR input ports, output ports of the first and second shuttle valves are individually connected to two input ports of the third shuttle valve, and an output port of the third shuttle valve is connected to the OR output port.

9. An interlock valve according to claim 8, wherein the return-side operating portion provided in the second end plate has a return piston for forcibly returning the valve member and a return pressure chamber for causing fluid pressure to act on the return piston, the return spring acts on the valve member through the return piston, and a return port is provided to the second casing and connected to the return pressure chamber.

10. An interlock valve according to claim 9, wherein the first end plate has an operation indicator to be brought into an indicating state by an action of fluid pressure and the operation indicator is connected to the OR output port and the driving pressure chamber.

11. An interlock valve according to claim 10, wherein the operation indicator has a transparent cover provided to the first end plate to project outside and an indicating element colored with a prominent color, disposed for forward and rearward movements inside the transparent cover, and biased elastically and rearward by a spring, a piston portion is provided to a lower end portion of the indicating element and is slidably housed in an indicating pressure chamber, and the indicating pressure chamber communicates with the driving pressure chamber.

12. An interlock valve according to claim 8, wherein the first end plate has an operation indicator to be brought into an indicating state by an action of fluid pressure and the operation indicator is connected to the OR output port and the driving pressure chamber.

13. An interlock valve according to claim 12, wherein the operation indicator has a transparent cover provided to the first end plate to project outside and an indicating element colored with a prominent color, disposed for forward and rearward movements inside the transparent cover, and biased elastically and rearward by a spring, a piston portion is provided to a lower end portion of the indicating element and is slidably housed in an indicating pressure chamber, and the indicating pressure chamber communicates with the driving pressure chamber.

\* \* \* \* \*